United States Patent [19]
Wang et al.

[11] Patent Number: 5,699,388
[45] Date of Patent: Dec. 16, 1997

[54] SYSTEM AND METHOD FOR FULLY DISTRIBUTED SYNCHRONIZATION OF A RADIO COMMUNICATION NETWORK

[75] Inventors: Zhonghe Wang, Lakeworth; Morris Moore, Wellington, both of Fla.

[73] Assignee: Motorola, Inc., Schaumburg, Ill.

[21] Appl. No.: 492,958

[22] Filed: Jun. 21, 1995

[51] Int. Cl.$^6$ .................................................. H04B 7/26
[52] U.S. Cl. .................. 375/356; 375/219; 375/413; 370/307; 370/509
[58] Field of Search ..................... 375/219, 356, 375/359, 364, 365; 370/509, 507, 514

[56] References Cited

U.S. PATENT DOCUMENTS

| | | | |
|---|---|---|---|
| 4,229,741 | 10/1980 | Groth, Jr. | 370/507 |
| 4,794,596 | 12/1988 | Gloyne et al. | 375/356 |
| 4,837,850 | 6/1989 | Maisel et al. | 375/356 |
| 5,237,570 | 8/1993 | Smolinske et al. | 370/95.1 |
| 5,327,581 | 7/1994 | Goldberg | 370/509 |
| 5,363,375 | 11/1994 | Chuang et al. | 375/356 |
| 5,426,633 | 6/1995 | Tanaka et al. | 370/507 |
| 5,517,505 | 5/1996 | Buchholz et al. | 370/105.1 |
| 5,537,685 | 7/1996 | Matsuno | 455/51.1 |
| 5,592,154 | 1/1997 | Lin et al. | 340/825.5 |
| 5,613,211 | 3/1997 | Matsuno | 375/356 |

*Primary Examiner*—Wellington Chin
*Assistant Examiner*—Jean B. Corrielus
*Attorney, Agent, or Firm*—Pablo Meles

[57] ABSTRACT

A system and method are shown for providing a fully synchronized two-way communication network having a number of transmission stations (10) and selective call receiving devices (27). Each transmission station (10) stores station identifying information and an updatable synchronization priority indicator. Periodically, each station (10) transmits a timing message that includes the station's identifying information, priority indicator, and information relating to the timing of the station's frame clock (45). When a given station receives a timing message transmitted from another station, it determines whether the other station is a direct upstream station thereof. The given station is responsive to a timing message from its direct upstream station for adjusting its frame clock (45) based upon the timing information contained in the message received from the direct upstream station. The given station thereby synchronizes itself with its direct upstream station. Each station also updates its stored priority indicator in the event that there is a change in the station's direct upstream station.

42 Claims, 7 Drawing Sheets

SYSTEM AND METHOD FOR FULLY DISTRIBUTED SYNCHRONIZATION OF A RADIO COMMUNICATION NETWORK

FIELD OF INVENTION

The present invention relates to a radio communication system and method for a network having a number of transmission stations and portable selective call receiving devices and more particularly to a system and method for providing fully distributed synchronization of such a radio communication network.

BACKGROUND OF THE INVENTION

Radio frequency communication networks are known to include a number of transmission stations or ports that provide two-way communication with a portable two-way selective call receiving device such as a cellular telephone or a pager. Each of the transmission stations includes a frame clock to control the timing of the frames in which message information is transmitted. The radio communication network is said to be synchronized if the frame clocks of all of the transmission stations are synchronous to within an allowed tolerance.

One method to synchronize a radio communication network requires that a network central controller be physically connected to each of the transmission units for controlling the timing, among other functions, of the entire network for synchronization. However, such a synchronization scheme substantially increases the cost and complexity of the network's central controller. The processing of other control messages is slowed down which in turn degrades the networks capacity and the quality of the service provided. In order to accomplish the synchronization, more control messages are required resulting in a decrease in the effective network capacity. Further, inter-network synchronization is virtually impossible. Moreover, if the network's central controller fails, the entire network is completely disabled. As networks become bigger and bigger with more and more stations included in the network, the severity of the problems associated with centrally controlled synchronization systems increases dramatically.

A second method for synchronizing a radio communication network requires a physical connection between all immediate neighboring stations so that each transmission station has the timing information of its immediate neighbors. This method is disadvantageous due to the requirement of the physical connection between immediate neighbors. In most cases, inter-system connections are impossible to implement with such a synchronization scheme; however, in certain environments, inter-network synchronization is needed. For example, an office environment may have an independent radio system or network that covers an area ranging from a fraction of a building to several buildings. The performance of such a network will degrade considerably if no inter-network synchronization is available even though each network is synchronized within itself. Further in a residential environment, a home base is an independent radio system wherein no existing cooperation between home bases is available. Therefore, neither of these methods provide a very good solution to synchronize this type of a radio communication network in an effective and efficient way.

SUMMARY OF THE INVENTION

In accordance with the present invention, the disadvantages of prior synchronization systems and methods for a radio communication network have been overcome. The system and method of the present invention provides fully distributed synchronization of a two-way radio communication network so that the network has a higher capacity and can provide a higher quality service to customers.

More particularly, the system and method of the present invention is implemented in a two-way communication network having a number of transmission stations for transmitting messages to selective call receiving devices in frames and for receiving transmitted messages. Each of the transmission stations includes a frame clock which is synchronized with the frame clocks of other transmission stations in the network by the present system and method. In order to implement the system and method, each of the transmission stations stores station identifying information to uniquely identify the station within the network and an updatable priority indicator identifying a synchronization priority of the station. Each of the stations transmits a timing message that includes the station's identifying information, the station's priority indicator and information relating to the timing of the station's frame clock. When a given transmission station receives a timing message transmitted from another station in the network, it determines whether the other station is directly upstream thereof. The given station is responsive to a timing message from its direct upstream station for adjusting its frame clock based upon the received timing information in order to synchronize itself with its direct upstream station. Each station also updates its stored priority indicator in the event that there is a change in the station's direct upstream station such as caused by a communication link being broken between the stations or a link being established with a previously unsynchronized station.

In one embodiment of the present invention, synchronization is provided by direct communication between transmission stations. In an alternate embodiment, synchronization between transmission stations can be established via portable two-way selective call receiving devices.

These and other advantages and novel features of the present invention, as well as details of an illustrated embodiment will be more fully understood from the following description and drawings.

DESCRIPTION OF THE PREFERRED EMBODIMENT

Figure 1:
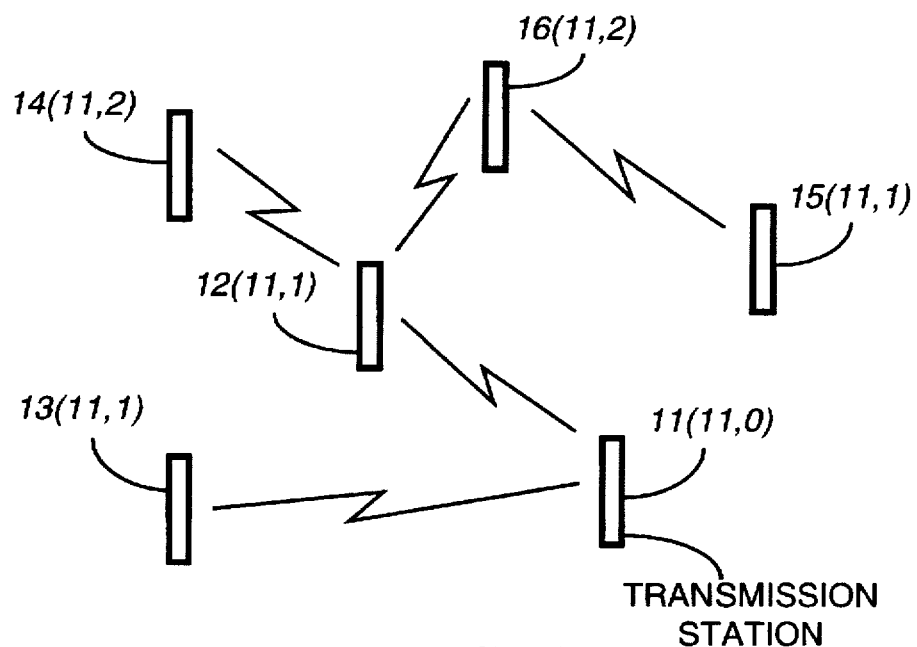
FIG. 1 is an illustration of a synchronization scheme utilizing transmission stations alone in accordance with one embodiment of the present invention.
Figure 2:
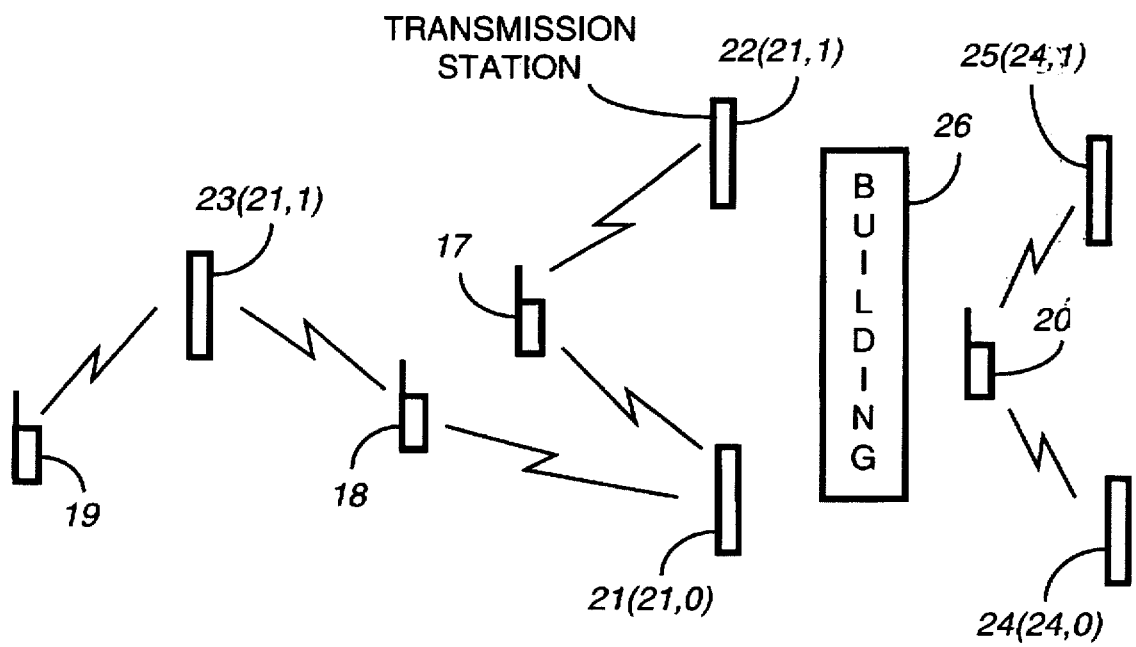
FIG. 2 is an illustration of a synchronization scheme utilizing portable two-way selective call receiving devices in accordance with a second embodiment of the present invention.

A radio communication network as shown in FIG. 1 includes a number of transmission stations 11–16 that are in synchronization in accordance with one embodiment of the present invention utilizing timing messages transmitted directly between stations. A transmission station synchronizes to a station having a higher synchronization priority from which it hears clearly as described in detail below. The transmission stations 21–25 shown in FIG. 2 illustrate a second embodiment of the present invention wherein synchronization between transmission stations is obtained utilizing timing messages that are transmitted between transmission stations via portable two-way selective call receiving devices 17–20.

Figure 3:
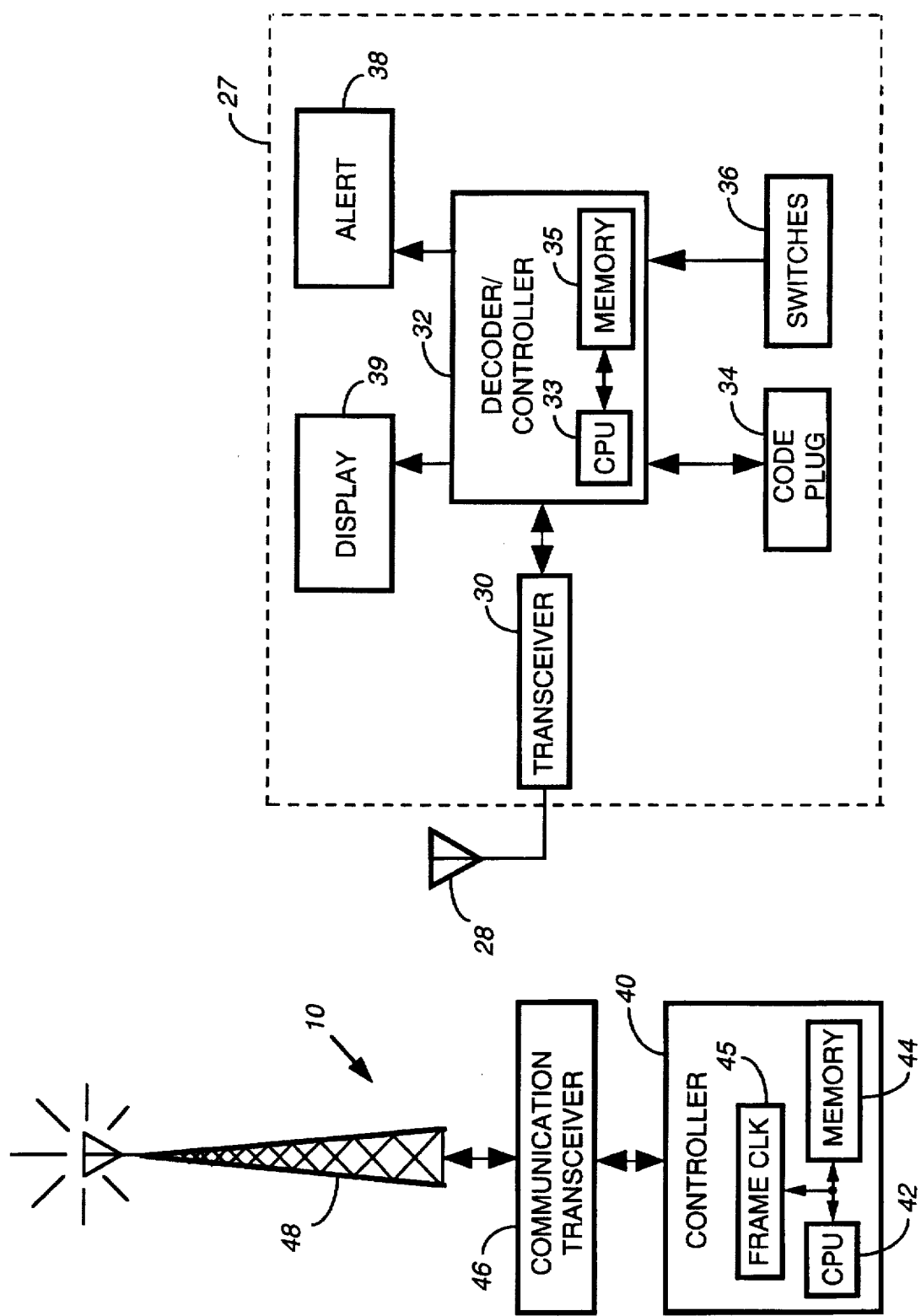
FIG. 3 is a block diagram illustrating a transmission station and a two-way selective call receiving device of a radio communication network employing the synchronization scheme of the present invention.

Each transmission station 11 . 16, 21–25 is of a type as depicted in FIG. 3 for the transmission station 10. The transmission station 10 includes a controller 40 that is coupled to a communication network such as a telephone network or the like to provide communication therebetween and a selective call receiving device. The controller 40 includes a central processing unit (CPU) 42 that operates in accordance with software and data stored in a memory 44 for controlling the operations of the transmission station 10. The controller 40 generates a message to be transmitted in accordance with a particular signalling protocol in one or more frames wherein the timing of the frames is controlled by a frame clock 45, the generated message is preferably coupled to a communication transceiver 46 that transmits the message as a radio frequency (RF) signal via an antenna 48 for reception by a particular selective call receiving device in accordance with an identification of the device that is included as a device address in the message. The antenna 48 also intercepts transmitted RF signals, the intercepted signals being coupled to the transceiver 46 which is responsive thereto for producing a data stream representative of a demodulated received signal. The received signal is then coupled to the controller 40 for processing. It is noted that instead of the transceiver 46 and single antenna 48, a transmitter and one or more receivers associated therewith may form a transmission station that is coupled to the controller 40 where the receivers need not be co-located with the transmitter as is well known in the art.

The portable two-way selective call receiving devices 17–20 may be such as a cellular telephone, a two-way pager or other two-way communication device. Each of the selective call receiving devices 1–20 may take the form of a device 27 shown in FIG. 3. The device 27 includes an antenna 28 for intercepting transmitted RF signals and for transmitting RF signals. The antenna 28 couples a received signal to a transceiver 30. The transceiver 30 produces a data stream representative of a demodulated received signal that is coupled to a decoder/controller 32. The transceiver 30 is also responsive to a modulation input such as message data, received from the decoder/controller 32 to modulate a carrier signal for transmission of the message out from the device 27. The decoder/controller 32 may include a central processing unit 33 such a microprocessor or the like for processing demodulation signal information in accordance with software stored in a memory 35. The decoder/controller 32 is responsive to a received message, that includes an address of the device for which the message was intended, by comparing the received address to one or more addresses stored in a code plug or code memory 34. If the decoder/controller 32 detects a match between a received address and a stored address, an alert signal is generated by an alerting device 38 so as to signal a user that a message has been received by the device 27. The device 38 may generate an audible alert and/or a tactile alert as is well known. The decoder/controller 32 is responsive to the actuation of switches 36 for the generation of a message and/or the transmission of a message by the transceiver 30. The decoder/controller 32 may also be responsive to the switches 36 to control a display 39 to display input or stored information. Each of the selective call receiving devices 27 has an associated home port or transmission station for communicating customer messages therebetween. The decoder/controller 32 of the device 27 is responsive to the interception of timing messages transmitted from other transmission stations having a higher synchronization priority than the synchronization priority of the device's home station to keep track of the timing information contained in these intercepted messages. The decoder/controller 32 generates timing messages for transmission to its associated home transmission station in order to be a conduit for timing information between two transmission stations as described in detail below with reference to FIGS. 2 and 4.

Returning to FIG. 1, each of the transmission stations 11–16 forms a port in the radio frequency communication network. Each of the ports has an associated, unique port priority identification (PID). The PID of a port may, for example, be the same as the port's ID. As shown in FIG. 1, the PIDs of the respective ports 11–16 are depicted as 11, 12, 13, 14, 15 and 16. A given port such as the port 12 is synchronized to another port such as the port 11 if the given port 12 has clearly heard or received a timing message from the other port 11 within the last T units of time and wherein timing information, $\Delta t_{ci}$ and $\Delta f_{ci}$, contained in the message indicates that the timing of the frame clocks are within tolerance. A port 11 is an upstream port of a given port 12, if the port 11 has a higher synchronization priority than the given port 12 and if the port 12 is synchronized to the other port 11. The direct upstream port of a given transmission station 12 is the port directly upstream from the given port with the highest synchronization priority. A port 14 is a downstream port of a given port 12 if the port 14 has a lower synchronization priority than the port 12 and the port 14 is synchronized to the port 12. A root port is a port without any direct upstream port i.e. the root port does not receive timing messages from any other port having a higher priority. In FIG. 1, port 11 is a root port and in FIG. 2, ports 21 and 24 are root ports. The current priority indicator (CPI) of a port is represented by (I,J) where I represents the PID of the port's root port and J represents the port's distance from that root port i.e. the number of ports that are upstream from the given port or the number of hops from a port to its root port. For example, port 16 has a CPI equal to (11,2) indicating that port 11 is the root port for port 16 and that port 11 is two hops from port 16 or the second port from port 16. A root port always has I=PID$_r$ where PID$_r$ is the PID of the root port and J=0 i.e. CPI$_r$=(PID$_r$, 0). A port B has a higher synchronization priority than a port A if the CPI of port B is less than the CPI of port A and more specifically, if $(I_B, J_B) < (I_A, J_A)$. Further, $(I_B, J_B) < (I_A, J_A)$ if $I_B < I_A$; or, $I_B = I_A$ and $J_B < J_A$. The port B also has a higher synchronization priority over the port A if the CPI of each port is the same such that $I_B = I_A$ and $J_B = J_A$ and the port priority indicator of port B, PID$_B$, is less than the port priority indicator of port A, PID$_A$.

The timing messages transmitted by one port or transmission station to another either directly or indirectly via a portable device 27 includes the PID and CPI of the transmitting port as well as the timing information, $\Delta t_{ci}$ and $\Delta f_{ci}$. The term $\Delta t_{ci}$ represents the cumulated starting time difference between the transmitting port and its root port which is i hops away. The timing information $\Delta f_{ci}$ represents the cumulated clock frequency difference between the transmitting port and its root port that is i hops away. The controller 40 of each port calculates the timing information $\Delta t_{ci}$ and $\Delta f_{ci}$ as follows. A root port has timing information ($\Delta t_{ci}$, $\Delta t_{fc}$) equal to (0,0) since as a root port, no cumulated starting time difference and clock frequency difference exists compared with itself. Each port that is i hops (i>0) away from its root port has available the following information: $\Delta t_{ci-1}$, $\Delta f_{ci-1}$, $\Delta t_i$ and $\Delta f_i$. The information, $\Delta t_{ci-1}$ and $\Delta f_{ci-1}$ are received from the port's direct upstream port. The timing information $\Delta t_i$ is the starting time difference between a given port and its direct upstream port as measured by the given port or a portable device 27 in the embodiment of FIG. 2. The timing information $\Delta f_i$ represents the clock frequency difference between the given port and its direct upstream port. This information can be estimated at the given port. Based on this available information, the cumulated timing errors are as follows:

$$\Delta t_{ci} = \Delta t_{ci-1} + \Delta t_i \text{ and } \Delta f_{ci} = \Delta f_{ci-1} + \Delta f_i.$$

The ports or transmission stations transmit these timing messages at least every T3 seconds. Whenever a timing difference is detected by a given port receiving a timing message from another port such that $|\Delta t_{ci}| > \epsilon_1/2 \geq 0$ or $|\Delta f_i| > \epsilon_2/2 \geq 0$ where $\epsilon_1$ and $\epsilon_2$ are predetermined tolerance values, the receiving port adjusts its timing, as discussed in detail below, in a way such that the timing error of the port approaches zero.

Figure 4:
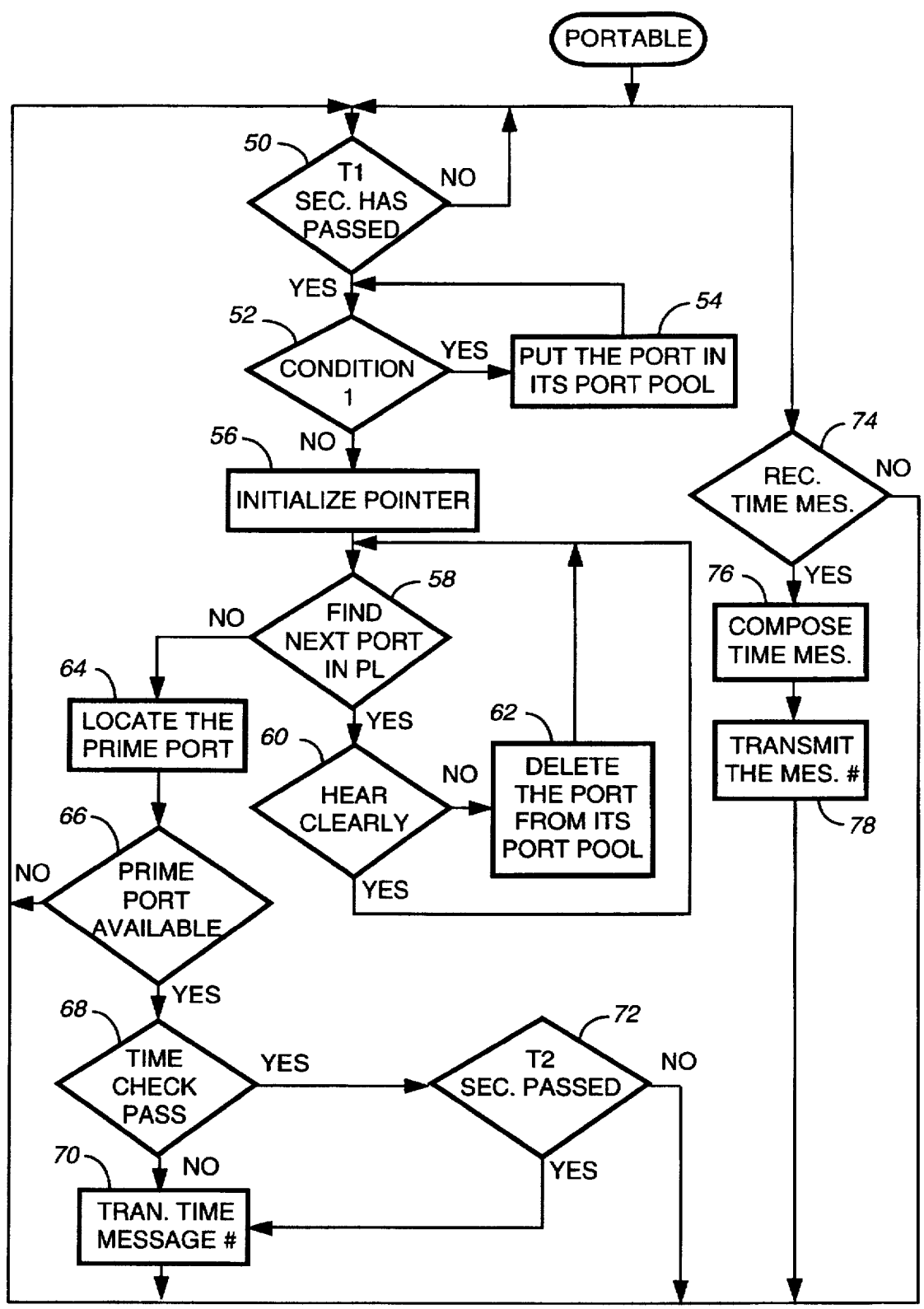
FIG. 4 is a flow chart illustrating the operation of the portable two-way selective call receiving device of FIG. 3 in implementing the synchronization scheme of FIG. 2.

When portable two-way selective call receiving devices are employed to transmit timing messages between a pair of ports or transmission stations, the CPU 33 of the device 27 operates in accordance with the flow chart of FIG. 4. During the channel scanning process of the device 27, the decoder/controller 32 checks for timing messages received from ports or transmission stations and every T1 second the device 27 checks the received timing messages. More particularly, at block 50, the CPU 33 of the decoder/controller 32 determines whether T1 seconds has passed. If so, the CPU 33 determines at block 52 whether the portable device 27 is hearing clearly from a new port having a higher CPI than the CPI of the portable device's home port to which the device is assigned or associated. If so, the new port is added to a list stored in the memory 35 representing the port pool of the device 27. From block 52, the CPU 33 proceeds to block 56 to initialize a pointer that points to the list of ports in the device's port pool. The CPU 33 increments the pointer to the next port in the port pool at block 58 and at block 60 determines whether the portable device 27 has clearly heard or received a timing message therefrom. If not, that port is deleted at block 62 from the portable device's port pool. After each port in the port pool has been interrogated to determine whether the port is still being clearly heard from, the CPU 33 proceeds to a block 64 to locate the prime port of the portable device 27. The prime port is the port in the device's port pool having the highest synchronization priority determined as discussed above with reference to the port's CPI and/or PID. If the CPU 33 locates a prime port at block 66, the CPU 33 proceeds to block 68 to implement a timing check and to determine whether the timing check has been passed. The standard timing of the portable device 27 is the timing of its prime port, i.e. the port having the highest synchronization priority among all ports in the pool and by definition having a priority greater than the synchronization priority of the portable device's home port.

The timing check performed at block 68 by the CPU 33 includes the detection of a difference between the timing of the portable device's home port and the portable device's standard timing, this difference being designated as the start timing difference. If the start timing difference, $d = |\Delta t_{ci} + \Delta t_i|$, is greater than a threshold, $\epsilon_1/2$ such that $d > \epsilon_1/2 \geq 0$, the CPU determines that the timing check did not pass and proceeds to block 70. At block 70, the CPU 33 generates a timing message that includes the PID and CPI of the portable device's prime port as well as the timing information including $\Delta t_{ci}$, $\Delta f_{ci}$ and $\Delta t_i$ from the prime port. The timing message is transmitted by the portable to its home port. The timing message is preferably piggybacked on the message traffic to be transmitted by the portable device in any event. It is noted, that this synchronization operation is implemented only by active portables so that idle, locked portables are not required to transmit the timing messages.

If no start timing difference is detected by the portable device 27 at block 68, the CPU 33 generates a timing message at block 70 for transmission if the CPU 33 determines at block 72 that a time period T$_2$ has passed since the last time the device 27 transmitted a timing message. Thus, the portable device 27 transmits a timing message at least every T$_2$ seconds where T$_2$>T$_1$. The portable device 27 also transmits a timing message whenever it receives timing information from its prime port, the identity of which is stored in the memory 35 upon detection at block 74. More particularly, whenever a timing message is received from the portable's prime port, an interrupt is generated by the CPU 33 that causes the CPU 33 to proceed to block 74. Once the CPU 33 determines that the timing message from its prime port has been received at block 74, the CPU proceeds to block 33 to generate a timing message 76 based on the received timing message. Thereafter, the CPU 33 couples the generated timing message to the transceiver 30 for transmission to its home port.

The use of portable two-way radio frequency communication devices enables a network with isolated coverage areas to be synchronized inside each covered area without requiring the ports or transmission stations to be close enough to hear clearly from their immediately neighboring ports. Using this embodiment of the present invention, the network with ubiquitous coverage is synchronized throughout its coverage area. It is noted that with this embodiment of the present invention, the heavier the message traffic, the more frequently the timing messages are transmitted within the network by the portable devices 27 thereby resulting in a more synchronized network. Further, because the frequency channels that carry the timing messages are available in the network, (the inbound and outbound control channels of the carried message traffic), a channel allocation scheme is not required nor are efforts required to receive messages in an outbound band. Costs are thereby reduced. Since the timing messages are piggybacked on the carried message traffic the life of a battery powering the portable device 27 is not affected.

Figure 5:
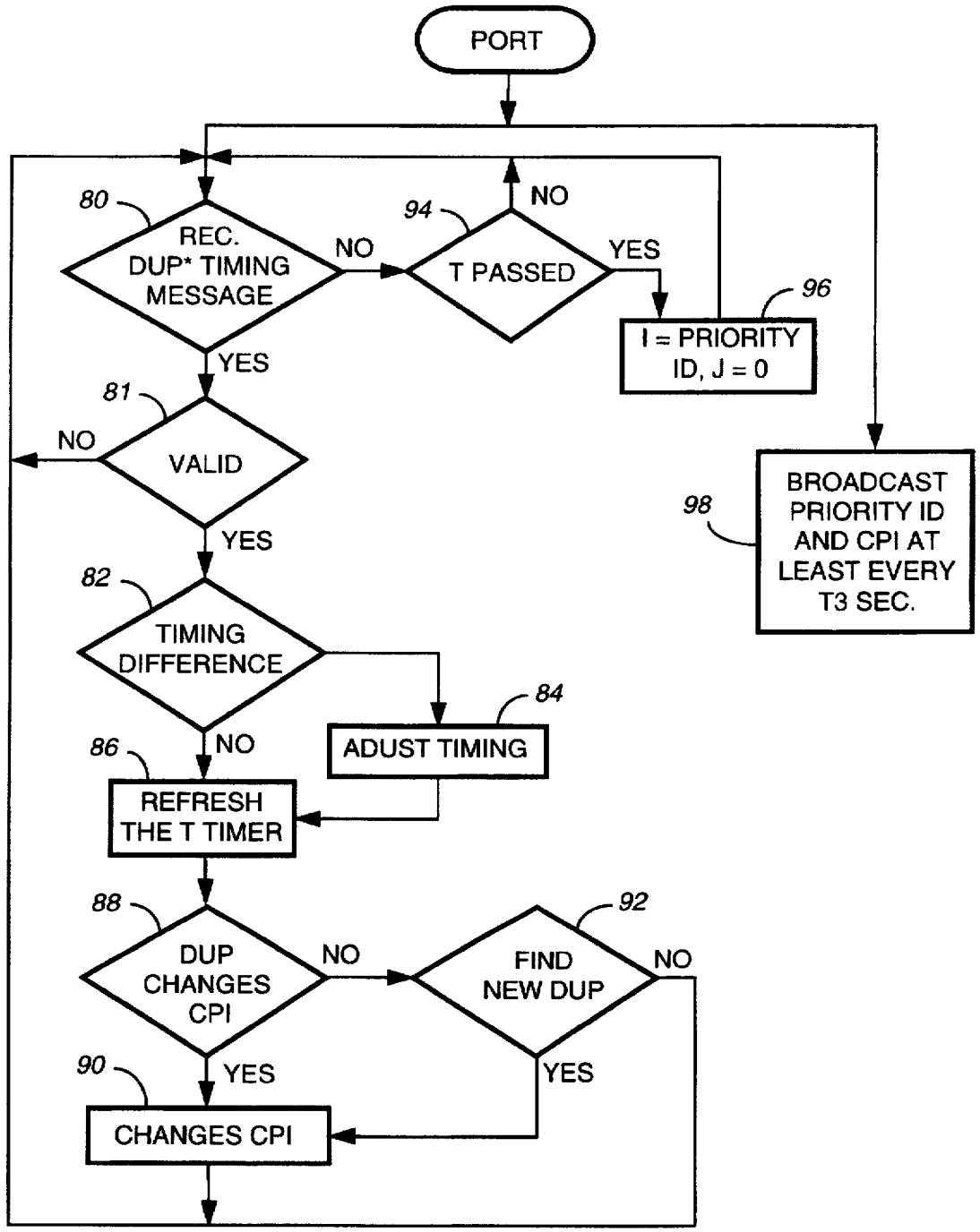
FIG. 5 is a flow chart illustrating the operation of a transmission station as shown in FIG. 3 in implementing the synchronization scheme shown in FIGS. 1 and 2.

In order to implement the synchronization scheme of the present invention, either the first embodiment depicted in FIG. 1 or the second embodiment depicted in FIG. 2, each of the transmission stations 10 of the network operate in accordance with the flow chart depicted in FIG. 5. More particularly, the CPU 42 of the port's controller 40 determines at a block 80 whether a timing message has been received from its direct upstream port as defined above. If so, the CPU 42 determines at block 81 whether the timing message is valid or not. If a valid timing message is detected, the CPU 40 proceeds to block 82 to determine whether the timing message indicates that there is a timing difference such that $|\Delta t_{ci}| > \epsilon_1/2 \geq 0$ or $|\Delta f_{ci}| > \epsilon_2/2 \geq 0$. If a timing difference is detected from the timing message received from the direct upstream port, the CPU 42 proceeds to block 84 to adjust the timing of its frame clock so as to reduce the timing difference to zero. From blocks 82 and 84 the CPU 42 proceeds to block 86 to refresh the timer, T. Thereafter, the CPU 42 determines at block 88 whether its direct upstream port has changed its current priority indicator, CPI. If so, the CPU 42 proceeds to block 90 to change its own CPI in accordance with the following rules which are set forth in order of priority as follows. First, all ports that are root ports keep their own timing such that a root port's CPI is equal to ($PID_r$, 0). This implies that if a previously downstream port lost synchronization with its upstream port and cannot find another upstream port it will become a root port. Second, if the CPI of a given port's direct upstream port is ($ID_r$, J) where $ID_r$ is the PID of the given port's root port, then the given port will have a CPI that is equal to ($ID_r$, J+1). This implies that if a direct upstream port changes its CPI, all ports downstream thereof will change their CPIs accordingly. Third, the direct upstream port B of a given port A is the proper direct upstream port if port B has the highest synchronization priority of any port upstream of A. This implies that if a downstream port A finds a new proper upstream port B having a higher CPI than that of port A's current direct upstream port C, the proper direct upstream port of port A is changed to port B. In view the above, it will be apparent to one of ordinary skill in the art that only the status of a port's direct upstream port is needed for a port to become synchronized.

If the CPU 42 of the port's controller 40 determines at block 88 that the direct upstream port has not changed its CPI, the CPU 42 proceeds from block 88 to block 92. At block 92, the CPU 42 tries to find a new direct upstream port and changes its own CPI accordingly as described above. If at block 80, the CPU 42 determines that the port has not received a timing message from its direct upstream port, the CPU proceeds to block 94. At block 94, the CPU 42 determines whether the time period T has passed indicating that the port has not heard from its direct upstream port 10 or a portable device 27 during the time period T. If the CPU 42 determines that the time period T has passed, the CPU 42 proceeds to block 96 to set its current priority indicator CPI equal to (PID, 0) where PID is its own port priority identification so as to become a root port. If the CPU 42 detects a timer interrupt at block 98 indicating that at least T3 seconds has passed since the port last transmitted a timing message, the CPU 42 composes the timing message at block 98 and couples the generated timing message to the transceiver 46 for transmission thereof via the antenna 48. Thus, each transmission port transmits a timing message at least every T3 seconds.

Figure 6:
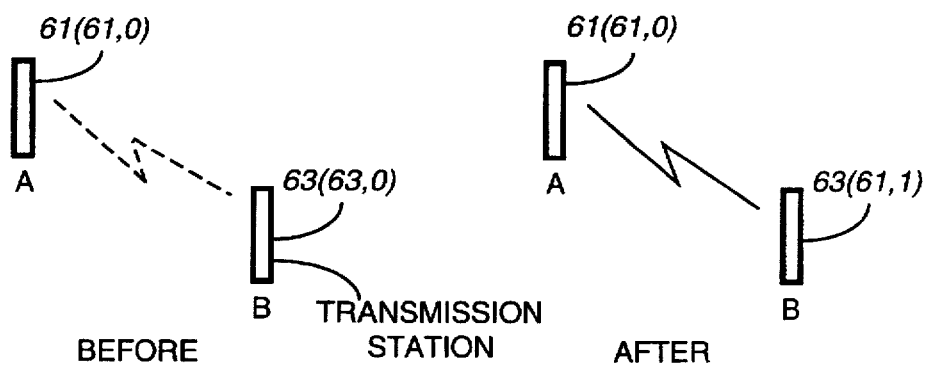
FIG. 6 is an illustration of a first example of the before and after synchronization operation of two isolated transmission stations.

FIG. 6 illustrates an example of the synchronization scheme of the present invention. More particularly, as can be seen therein, before synchronization, a port A having PID=61 and CPI=(61, 0) is isolated from a port having PID=63 and CPI=(63, 0). If port B receives a timing message from port A so that port B is synchronized to port A, the CPI of port B changes to (61, 1) indicating that port B's root port is port A having a PID equal to 61 and port A or 61 is 1 step away from port B. Port B changes its CPI instead of port A because port B's original CPI of (63, 0) was of lower priority than port A's CPI of (61, 0).

Figure 7:
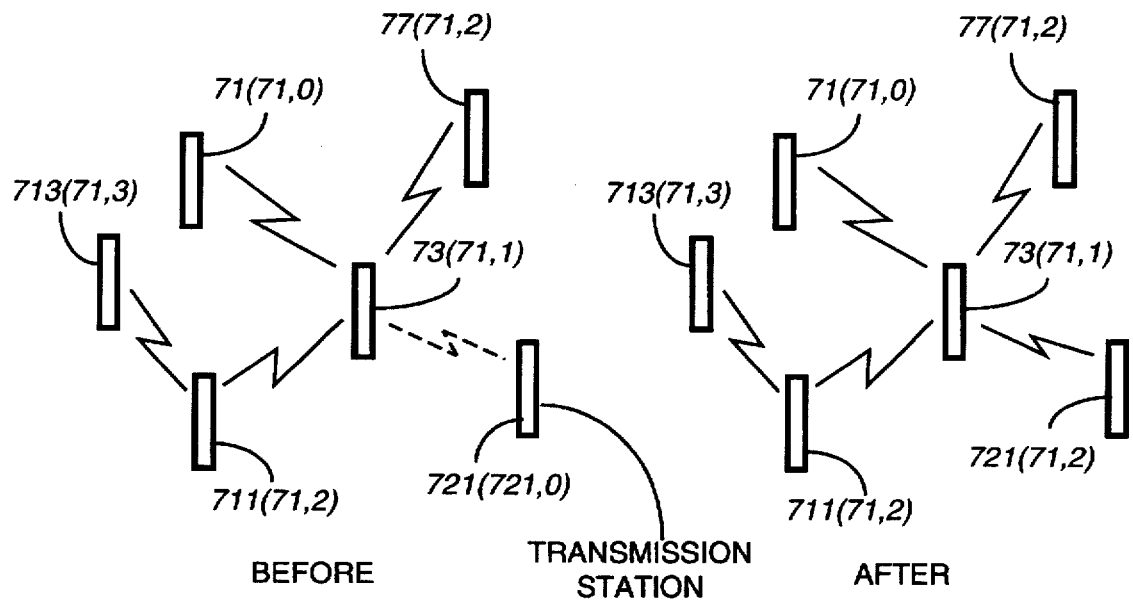
FIG. 7 is an illustration of a second example of the before and after synchronization operation of a group of transmission stations and a single transmission station having a lower synchronization priority.

In a second example as depicted in FIG. 7, a port 721 is isolated from a group of synchronized transmission station including ports 71, 73, 77, 711, and 713. If port 721 receives a timing message from port 73 so that port 721 become synchronized, the port 721 changes its CPI from (721, 0) to (71, 2) indicating that it is two hops from the root port 71. The port 721 changes its CPI according to port 73's CPI because port 721's original CPI of (721, 0) indicated a lower synchronization priority than the CPI of port 73.

Figure 8:
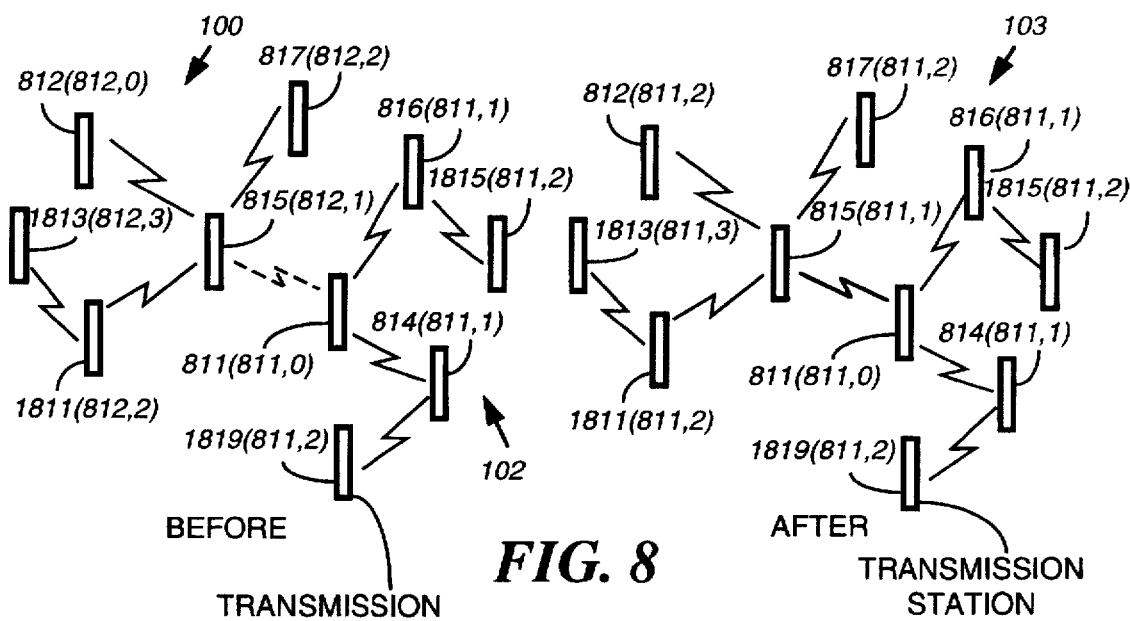
FIG. 8 is an illustration of a third example of the before and after synchronization operation of two groups of previously isolated transmission stations.

The example depicted in FIG. 8 shows two groups of transmission stations, group 100 and group 102. Each of the ports 815, 817, 1811 and 1813 of the group 100 is synchronized to a root port 812; whereas each of the ports 814,816, 1815 and 1819 is synchronized to the root port 811. When the port 815 of group 100 clearly hears the timing message from the root port 811 of group 102, the port 815 becomes synchronized with the port 811 and port 815 changes its CPI from (812, 1) to (811, 1) to indicate that its new root port is the port 811. Because ports 817, 1811 and 1813 are downstream of port 815 and port 815 changed its CPI, these downstream ports change their associated CPIs accordingly. Specifically, the CPI of port 817 changes from (812, 2) to (811, 2); port 1811 changes its CPI from (812, 2) to (811, 2); and port 1813 changes its CPI from (812, 3) to (811, 3). Because the new CPI of port 815, (811, 1), has a higher synchronization priority than the CPI, (812, 0), of the port 812 before the change, the port 812 changes its CPI to (811, 2). The two previously unsynchronized groups of ports 100 and 102 thus become synchronized to form a fully synchronized group of ports 103.

Figure 9:
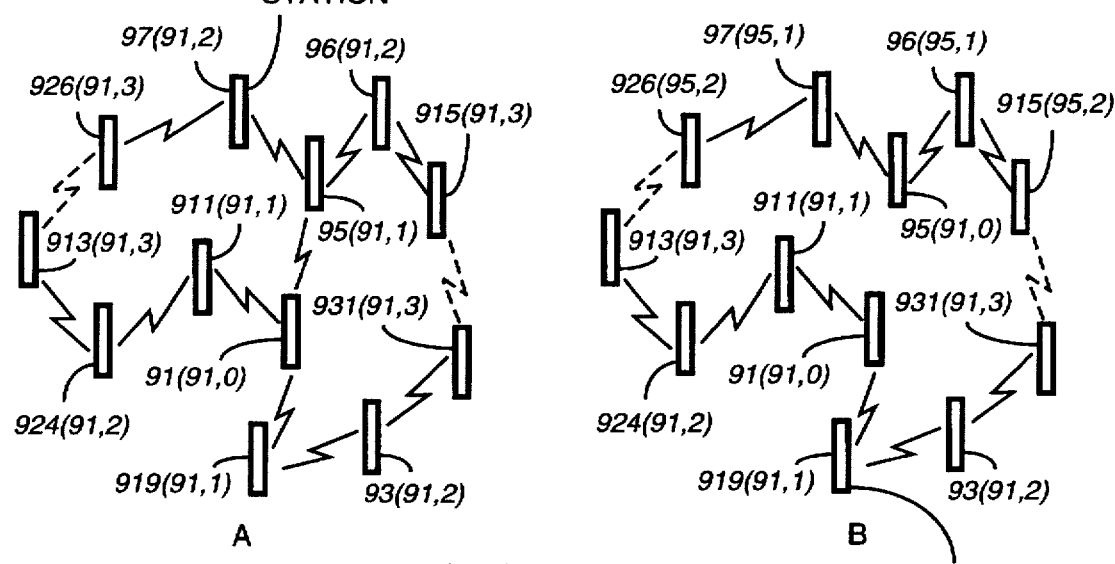
FIG. 9 forms an illustration of a fourth example depicting a synchronized group of transmission stations, a break in one of the links thereof and the re-synchronization of the group.
Figure 9:
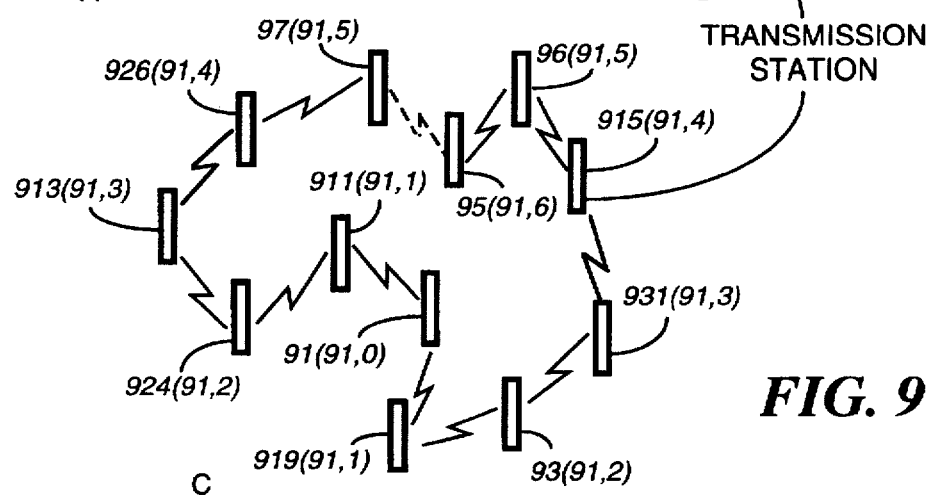

The example depicted in FIG. 9 illustrates the re-synchronization of a synchronized group when a link between a pair of ports is broken and other links are established. Specifically, in group A of FIG. 9, the group of transmitters depicted therein has a root port 91 that is the direct upstream port of a port 95. In group B FIG. 9, the link between the ports 91 and 95 has been broken. Because the port 95 no longer has an upstream port, the port 95 changes its CPI from (91, 1) to (95, 0). Because ports 96, 97, 915 and 926 are downstream of port 95 they change their CPIs accordingly. Specifically, port 96 changes its CPI from (91, 2) to (95, 1); port 97 changes its CPI from (91, 2) to (95, 1); port 915 changes its CPI from (91, 3) to (95, 2) and port 926 changes its CPI from (91, 3) to (95, 2). When a link is established between the port 931 and 915 and between the ports 913 and 926 as shown in group C of FIG. 9, the port 915 has a CPI that is lower in priority than the CPI of the port 931 causing the port 915 to change its CPI from (95, 2) to (91, 4). Similarly, the port 96 changes its CPI from (95, 1) to (91, 5) and the port 95 changes its CPI from (95, 0) to (91, 6). Because of the link between ports 926 and 913, the CPI of port 913, (91, 3), has a higher synchronization priority than the CPI of the port 926, (95, 2). Therefore, the port 926, changes its CPI to (91, 4). This causes the port 97 to change its CPI from (95, 1) to (91, 5).

As can be seen, the synchronization scheme described above is simple and stable with little overhead of the control messages. The information from a port's direct upstream port is what is needed for synchronization. Although there is a high probability for a port with a high synchronization priority to have a large synchronization group, the proposed scheme does not consider the effects of the number of ports in a synchronization group explicitly. It is desirable that a small size synchronized group synchronize to a bigger synchronized group. Algorithms with this property are typically based on the knowledge of the size of a synchronized group. Unfortunately, there is no easy way to obtain this information in a fully distributed scheme. However, instead of requiring knowledge of the size of a synchronized group, an isolated port can be distinguished from a root port with multiple downstream ports by adding a status flag to the CPI of each port. The status flag may, for example, be true or "1", if the port is a part of a synchronized group and the flag may be false or "0", if the port is not a part of a synchronized group. The isolated port can then be required to synchronize to a synchronized group as opposed to the group synchronizing to the isolated port.

In order to implement this scheme, all ports having a CPI with J=1, such that they are a direct downstream port of a root port, transmit a message indicating that the port is a downstream port of a root port having a port priority ID equal to $PID_r$. If portable devices are employed such as in the scheme of FIG. 2, the devices 27 upon receipt of such a message transmit the message to their home base with PID set equal to the received $PID_r$ and a higher CPI than the transmitting port. Upon receipt of such a transmitted message, the root port changes its status accordingly. This status flag is then included in the CPI information transmitted from the receiving port in its timing message. A port is required to update its status flag to "1" whenever it becomes a downstream port. The following two rules should also be applied. First, for two isolated ports, the port with a lower synchronization priority will synchronize to the port with a higher synchronization priority. Second, an isolated port will always synchronize to the port which is a port of a synchronized group.

Figure 10:
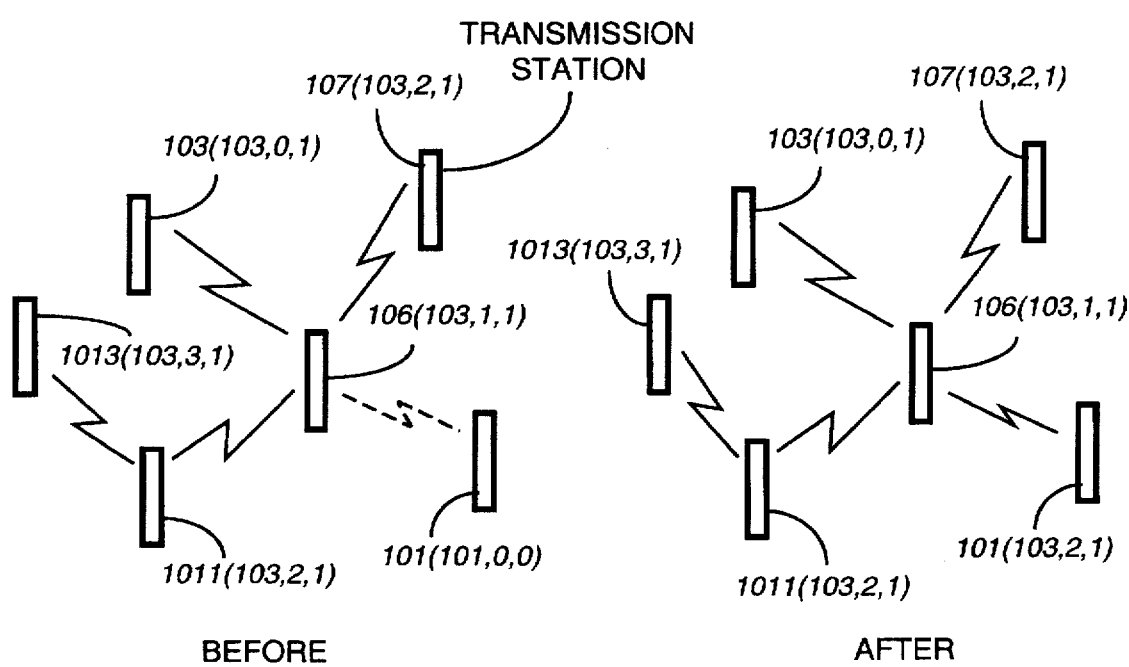
FIG. 10 is an illustration of a fifth example of the before and after synchronization operation of an isolated transmission station and an existing synchronization group of transmission stations utilizing a status flag in the current priority indicators of the stations.

FIG. 10 illustrates an example of a synchronization scheme utilizing a status flag, M in the CPI where CPI=(I, J,M). As can be seen, each of the ports in the synchronized group, 103, 106, 107, 1011 and 1013 have a status flag set to "1" indicating that they are part of a synchronized group. However, because the port 101 is an isolated port, its status flag is set to 0. When a link is established between the ports 101 and 106, because the port 101 has a higher synchronization priority than the port 106, in accordance with the earlier embodiment of the present invention, each of the ports of the synchronized group would have been required to change their CPIs. However, in accordance with this alternative embodiment utilizing the status flag, the isolated port 101 is required to change its CPI to indicate that its root port is port 103 which is the second port from the port 101.

As can be seen from the above description, the synchronization scheme of the present invention is fully distributed, simple, stable and free from cumulative timing errors. A radio frequency communication network utilizing the present scheme will have a performance comparable to a network having a fully connected centrally controlled system without the disadvantages associated therewith. For example, the connection costs between the system center and ports or among immediately neighboring ports will be decreased if not completely eliminated; the cost and complexity of the network's center will be substantially decreased and the speed of the network's response will increase which in turn will lead to a higher system capacity and a higher quality service. Further, the network will become more robust as well as adaptive to changing environments such as clock frequency shifting due to temperature changes. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. In a two-way radio communication network having a plurality of transmission stations for transmitting messages to selective call receiving devices in frames and for receiving transmitted messages, each of said transmission stations including a frame clock to control the timing of said frames, said clock having associated timing information, a system for synchronizing the timing of the frame clocks of a plurality of said stations comprising:

means contained in each of said stations for storing station identifying information to uniquely identify said station within said network and an updatable priority indicator identifying a synchronization priority of the station;

means contained in each of said stations for transmitting a timing message including said station identifying information, said priority indicator and said timing information;

means contained in each of said stations responsive to the receipt of a timing message transmitted from another of said stations for determining whether said other station is a direct upstream station;

means contained in each of said stations responsive to a timing message received from a direct upstream station for adjusting said frame clock based on the timing information in said timing message to synchronize the station with said direct upstream station; and means contained in each of said stations for updating said stored priority indicator.

2. In a two-way radio communication network as recited in claim 1 wherein said priority indicator updating means updates the stored priority indicator of its station if its station has not received a timing message from an upstream station within a predetermined period of time.

3. In a two-way radio communication network as recited in claim 1 wherein said priority indicator updating means updates the stored priority indicator of its station if said direct upstream station has changed its priority indicator.

4. In a two-way radio communication network as recited in claim 1 wherein each of said stations includes means for detecting a new direct upstream station and said priority indicator updating means of each station updates the stored priority indicator of its station if a new direct upstream station is detected.

5. In a two-way radio communication network as recited in claim 4 wherein said detecting means includes means for comparing the priority indicators in timing messages received from a plurality of stations to determine which of said priority indicators has the highest synchronization priority, said updating means updating the stored priority indicator according to the priority indicator having the highest synchronization priority.

6. In a two-way radio communication network as recited in claim 5 wherein a priority indicator for a given station includes information identifying a root station and a value indicating the distance that said given station is from said root station, said root station having no direct upstream station.

7. In a two-way radio communication network as recited in claim 6 wherein a first priority indicator has a higher synchronization priority than a second priority indicator if the root station identified in each of said indicators is the same and the distance value in said first priority indicator is less than the distance value in said second priority indicator.

8. In a two-way radio communication network as recited in claim 6 wherein a first priority indicator has a higher synchronization priority than a second priority indicator if the root station of said first priority indicator is identified therein by information indicating a higher synchronization priority than the information identifying the root station of the second priority indicator.

9. In a two-way radio communication network as recited in claim 6 wherein a first station having a first priority indicator has a higher synchronization priority than a second station having a second priority indicator if said first and second priority indicators are equal and the information in the timing message identifying said first station indicates a higher priority than information in the timing message identifying said second station.

10. In a two-way radio communication network as recited in claim 1 wherein a first station is determined to be an upstream station of a second station by said determining means of said second station if said second station has received a timing message from said first station and the priority indicator of the first station in the received timing message has a higher synchronization priority than the stored priority indicator of the second station.

11. In a two-way radio communication network as recited in claim 10 wherein a priority indicator for a given station includes information identifying a root station and a value indicating the distance that said given station is from said root station, said root station having no direct upstream station.

12. In a two-way radio communication network as recited in claim 11 wherein a first priority indicator has a higher synchronization priority than a second priority indicator if the root station identified in each of said indicators is the same and the distance value in said first priority indicator is less than the distance value in said second priority indicator.

13. In a two-way radio communication network as recited in claim 11 wherein a first station having a first priority indicator has a higher synchronization priority than a second station having a second priority indicator if said first and second priority indicators are equal and the information in the timing message identifying said first station indicates a higher priority than information in the timing message identifying said second station.

14. In a two-way radio communication network as recited in claim 11 wherein a priority indicator for a given station further includes at least status information indicating whether said station is synchronized to a plurality of other stations or unsynchronized, said updating means in said unsynchronized station being responsive to a receipt of a timing message from a station with a status flag indicating said station is synchronized to update the stored priority indicator of said unsynchronized station.

15. In a two-way radio communication network as recited in claim 1 wherein said system includes a plurality of selective call receiving devices each comprising:
 means for receiving timing messages from a plurality of stations including a station associated with said device and at least one additional station;
 means for transmitting a timing message to said associated station including the station identifying information of said additional station, the priority indicator of said additional station and timing information based on the timing information of the additional station in the received timing message.

16. In a two-way radio communication network as recited in claim 15 including
 means for comparing the priority indicators of said plurality of stations from which a timing message was received to identify the additional stations having a higher synchronization priority than said associated station and among said additional stations with a higher synchronization priority, to identify the station with a highest synchronization priority; and
 means for comparing the timing information in the timing message from the station having the highest synchronization priority to the timing information in the timing message from said associated station to determine an out of tolerance difference therebetween, said timing information in the timing message transmitted from said selective call receiver including information representing said difference.

17. In a two-way radio communication network as recited in claim 16 wherein said frame clock adjusting means in each of said stations includes means responsive to a timing message received from a direct upstream port via an associated selective call receiver, the timing message having information representing a difference in the timing information for adjusting the timing of the station's frame clock to reduce said difference.

18. In a two-way radio communication network having a plurality of transmission stations for transmitting messages to selective call receiving devices in frames and for receiving transmitted messages, each of said transmission stations including a frame clock to control the timing of said frames, said clock having associated timing information, a system for synchronizing the timing of the frame clocks of a plurality of said stations comprising:
 means contained in each of said stations for storing station identifying information to identify said station within said network and an updatable priority indicator identifying a synchronization priority of the station;
 means contained in each of said stations for transmitting a timing message including said station identifying information, said priority indicator and said timing information;
 means contained in a plurality of said selective call receiving devices for receiving timing messages from a plurality of stations including a station associated with said device and at least one additional station having a higher synchronization priority than said station associated with the device;
 means contained in said plurality of selective call receiving devices for transmitting a timing message to said associated station including the station identifying information of said additional station, the priority indicator of said additional station and timing information based on the timing information of the additional station in the received timing message;
 means contained in each of said stations responsive to the receipt of a timing message from a selective call receiving device for adjusting the frame clock of the station based on the timing information in the received message to synchronize the station with said additional station; and
 means contained in each of said stations for updating said stored priority indicator.

19. In a two-way radio communication network as recited in claim 18 wherein each of said selective call receiving devices includes means for comparing the priority indicators of said plurality of stations from which a timing message was received to identify the additional stations having a higher synchronization priority than said associated station and among said additional stations with a higher synchronization priority, to identify the station with a highest synchronization priority.

20. In a two-way radio communication network as recited in claim 18 wherein a priority indicator for a given station includes information identifying a root station and a value indicating the distance that said given station is from said root station, said root station having no direct upstream station.

21. In a two-way radio communication network as recited in claim 18 including means for comparing the timing information in the timing message from the station having the highest synchronization priority to the timing information in the timing message from said associated station to determine an out of tolerance difference therebetween, said timing information in the timing message transmitted from said selective call receiver including information representing said difference.

22. In a two-way radio communication network as recited in claim 18 wherein each of said stations includes means responsive to the receipt of a timing message for determining whether the message identifies a direct upstream station, said adjusting means adjusting said frame clock only in response to a timing message identifying a direct upstream station.

23. In a two-way radio communication network as recited in claim 22 wherein said priority indicator updating means updates the stored priority indicator of its station if said direct upstream station has changed its priority indicator.

24. In a two-way radio communication network as recited in claim 22 wherein each of said stations includes means for detecting a new direct upstream station and said priority indicator updating means of each station updates the stored priority indicator of its station if a new direct upstream station is detected.

25. In a two-way radio communication network as recited in claim 22 wherein said determining means includes means for comparing the priority indicators in timing messages received from a plurality of stations to determine which of said priority indicators has the highest synchronization priority, said updating means updating the stored priority indicator according to the priority indicator having the highest synchronization priority.

26. A radio communication network with fully distributed synchronization comprising:

a plurality of fixed location stations for transmitting messages including a timing message and for receiving messages including a timing message in accordance with a clock in each of said stations, a timing message transmitted by a given station including an identification of said given station, a priority indicator identifying a synchronization priority of said given station and timing information associated with said clock, and each of said stations being responsive to the receipt of a timing message identifying a direct upstream station for synchronizing its clock with the clock of said direct upstream station; and a plurality of portable two-way selective call receiving devices for receiving messages including timing messages and for transmitting messages including timing messages, each of said portable devices being responsive to messages received form a plurality of stations for determining the received message from the station having the highest synchronization priority and for transmitting a timing message to another station including the identification of said highest priority station, the priority indicator thereof and timing information based on the timing information received from the highest priority system.

27. A radio communication network with fully distributed synchronization as recited in claim 26 wherein said station includes a transmitter and at least one receiver that is not co-located with said transmitter.

28. A radio communication network with fully distributed synchronization as recited in claim 27 wherein a first station is a direct upstream station of a second station if said second station has received a clear timing message from said first station and said second station has a lower synchronization priority than said first station and the first station has the highest synchronization priority of any other station from which said second station has received a clear timing message.

29. In a two-way radio communication network having a plurality of transmission stations for transmitting and receiving messages including timing messages for synchronizing said transmission stations, a timing message transmitted by a given station including an identification of said given station, a priority indicator identifying a synchronization priority of said given station and timing information associated with said given station, a portable two-way selective call receiving device comprising:

a receiver for receiving messages including a timing message transmitted from each of a plurality of said stations including a station associated with said device and at least one additional station;

means for comparing the priority indicators of said plurality of stations from which a timing message was received to identify the additional stations having a higher synchronization priority than said associated station and among said additional stations with a higher synchronization priority, to identify the station with a highest synchronization priority;

a message generator for generating a timing message including the station identifying information of said highest priority station, the priority indicator of said highest priority station and timing information based on the timing information of the highest priority station in the received timing message; and a transmitter for transmitting messages to a station including a timing message.

30. A portable two-way selective call receiver for use in a radio communication network as recited in claim 29 wherein a priority indicator for a given station includes information identifying a root station and a value indicating the distance that said given station is from said root station, said root station having no direct upstream station.

31. A portable two-way selective call receiver for use in a radio communication network as recited in claim 30 wherein a first priority indicator has a higher synchronization priority than a second priority indicator if the root station identified in each of said indicators is the same and the distance value in said first priority indicator is less than the distance value in said second priority indicator.

32. A portable two-way selective call receiver for use in a radio communication network as recited in claim 30 wherein a first priority indicator has a higher synchronization priority than a second priority indicator if the root station of said first priority indicator is identified therein by information indicating a higher synchronization priority than the information identifying the root station of the second priority indicator.

33. A portable two-way selective call receiver for use in a radio communication network as recited in claim 30 wherein a first station having a first priority indicator has a higher synchronization priority than a second station having a second priority indicator if said first and second priority indicators are equal and the information in the timing message identifying said first station indicates a higher priority than information in the timing message identifying said second station.

34. A portable two-way selective call receiver for use in a radio communication network as recited in claim 29 including means for comparing the timing information in the timing message from the station having the highest synchronization priority to the timing information in the timing message from said associated station to determine an out of tolerance difference therebetween, said timing information in the timing message transmitted from said selective call receiver including information representing said difference.

35. A method for synchronizing a two-way radio communication network having a plurality of transmission stations for transmitting messages to selective call receiving devices in frames and for receiving transmitted messages, each of said transmission stations including a frame clock to control the timing of said frames, said clock having associated timing information, said method comprising:

storing in each of said stations, station identifying information to identify said station and an updatable priority indicator identifying a synchronization priority of the station;

transmitting, from each of said stations, a timing message including said station identifying information, said priority indicator and said timing information of said station;

determining, in a given station in response to the receipt by the given station of a timing message transmitted from another of said stations, whether said other station is a direct upstream station; and adjusting, in said given station, in response to a timing message received from a direct upstream station, said given station's frame clock based on the timing information in said timing message to synchronize the given station with said direct upstream station.

36. A method for synchronizing a two-way radio communication network as recited in claim 35 further including the step of updating said stored priority indicator of said given station.

37. A method for synchronizing a two-way radio communication network as recited in claim 36 wherein the stored priority indicator of said given station is updated if the given station has not received a timing message from an upstream station within a predetermined period of time or if said direct upstream station has changed its priority indicator.

38. A method for synchronizing a two-way radio communication network as recited in claim 36 including the step of detecting a new direct upstream station and wherein the stored priority indicator of said given station is updated if a new direct upstream station is detected.

39. A method for synchronizing a two-way radio communication network as recited in claim 38 wherein said detecting step includes comparing the priority indicators in timing messages received from a plurality of stations to determine which of said priority indicators has the highest synchronization priority, and said updating step updates the stored priority indicator according to the priority indicator having the highest synchronization priority.

40. A method for synchronizing a two-way radio communication network as recited in claim 39 wherein a priority indicator for a given station includes information identifying a root station and a value indicating the distance that said given station is from said root station, said root station having no direct upstream station.

41. A method for synchronizing a two-way radio communication network as recited in claim 35 wherein a first station is determined to be an upstream station of a second station by said determining means of said second station if said second station has received a timing message from said first station and the priority indicator of the first station in the received timing message has a higher synchronization priority than the stored priority indicator of the second station.

42. A method of controlling a portable selective call receiving device in a two-way radio communication network having a plurality of transmission stations for transmitting and receiving messages including timing messages for synchronizing said transmission stations, a timing message transmitted by a given station including an identification of said given station, a priority indicator identifying a synchronization priority of said given station and timing information associated with said given station, said method comprising:

receiving messages including a timing message transmitted from each of a plurality of said stations including a station associated with said device and at least one additional station;

comparing the priority indicators of said plurality of stations from which a timing message was received to identify the additional stations having a higher synchronization priority than said associated station and among said additional stations with a higher synchronization priority, to identify the station with a highest synchronization priority;

generating a timing message including the station identifying information of said highest priority station, the priority indicator of said highest priority station and timing information based on the timing information of the highest priority station in the received timing message; and transmitting messages to a station including a timing message.

* * * * *